(12) United States Patent
Alho et al.

(10) Patent No.: US 6,640,096 B1
(45) Date of Patent: Oct. 28, 2003

(54) METHOD AND APPARATUS FOR USE IN PROVIDING A DISCOUNTED CALL RATE FOR WIRELESS COMMUNICATIONS

(75) Inventors: Steven Alho, North Arlington, NJ (US); Brian Anderson, Seattle, WA (US); Heidi Benton, Bellevue, WA (US); Jacob D. Feinstein, Jupiter, FL (US); Dina M. Scharosch, Everett, WA (US); Harold Zeitz, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/557,381

(22) Filed: Apr. 25, 2000

Related U.S. Application Data

(60) Provisional application No. 60/148,179, filed on Aug. 9, 1999.

(51) Int. Cl.[7] .............................................. H04M 11/00
(52) U.S. Cl. .................... 455/406; 455/414; 455/422; 455/462
(58) Field of Search ................................ 455/406, 407, 455/408, 414, 415, 462–464, 456; 379/121, 111, 143, 113, 114

(56) References Cited

U.S. PATENT DOCUMENTS

| | | | | |
|---|---|---|---|---|
| 5,153,907 A | * | 10/1992 | Pugh | 379/143 |
| 5,295,180 A | * | 3/1994 | Vendetti | 455/456 |
| 5,333,184 A | | 7/1994 | Doherty et al. | 379/115 |
| 5,381,467 A | * | 1/1995 | Rosinski et al. | 379/121.01 |
| 5,521,968 A | | 5/1996 | Furuya et al. | 379/114 |
| 5,557,664 A | | 9/1996 | Burns et al. | 379/114 |
| 5,666,405 A | | 9/1997 | Weber | 379/127 |
| 5,758,288 A | * | 5/1998 | Dunn | 455/456 |
| 5,771,282 A | | 6/1998 | Friedes | 379/121 |
| 6,018,652 A | * | 1/2000 | Frager | 455/406 |
| 6,243,572 B1 | * | 6/2001 | Chow | 455/408 |
| 6,332,075 B1 | * | 12/2001 | Verdonk | 455/408 |

* cited by examiner

*Primary Examiner*—Vivian Chin
*Assistant Examiner*—John J. Lee
(74) *Attorney, Agent, or Firm*—Gray Cary Ware & Freidenrich; Terrance A. Meador

(57) ABSTRACT

Methods and apparatus for use in providing discounted call rates for wireless communications are described. In one particular implementation, the method includes the steps of receiving a call record having an originating telephone number, a terminating telephone number, and one or more system identification codes (SIDs); determining whether the one or more SIDs are included as part of a predetermined geographic area that is smaller than and included within boundaries of a home area of at least one of the telephone numbers; determining whether a predefined relationship exists between the originating telephone number and the terminating telephone number; and providing data that is indicative of a discounted wireless call rate if it is determined that the one or more SIDs are included as part of the predetermined geographic area and the predetermined relationship exists between the originating telephone number and the terminating telephone number.

18 Claims, 6 Drawing Sheets

| ACCOUNT 1 ||
|---|---|
| GROUP CALLING ACTIVE FLAG ||
| NUMBERS ON ACCT: | GROUP NUMBERS: |
| N1 | M1 |
| N2 | M2 |
| ⋮ | ⋮ |
| NX | MY |

| ACCOUNT 2 ||
|---|---|
| GROUP CALLING ACTIVE FLAG ||
| NUMBERS ON ACCT: | GROUP NUMBERS: |
| N1 | M1 |
| N2 | M2 |
| ⋮ | ⋮ |
| NX | MY |

⋮

| ACCOUNT N ||
|---|---|
| GROUP CALLING ACTIVE FLAG ||
| NUMBERS ON ACCT: | GROUP NUMBERS: |
| N1 | M1 |
| N2 | M2 |
| ⋮ | ⋮ |
| NX | MY |

FIG. 2

METHOD AND APPARATUS FOR USE IN PROVIDING A DISCOUNTED CALL RATE FOR WIRELESS COMMUNICATIONS

RELATED APPLICATION

This Application claims the benefit of U.S. Provisional Application No. 60/148,179, filed Aug. 9, 1999, entitled "Method and Apparatus for Use in Providing a Discounted Call Rate for Wireless Communications," which is incorporated herein in its entirety.

BACKGROUND OF THE INVENTION

1. Field of the Invention

The present invention relates generally to the field of methods and apparatus for use in providing discounted call rates for wireless communications.

2. Description of the Related Art

In conventional telephone billing systems, the basic cost for a telephone toll call placed between telephone subscribers is typically billed to the subscriber originating the call. Such a basic cost is the cost that the originator at a wired telephone station would be required to pay for the call if the call were to be completed directly to another wired telephone station terminating the number dialed. The basic cost for each such call is usually a function of the length of time that passes while the originating subscriber is connected to the terminating subscriber.

To develop the basic cost, time is divided into predetermined indivisible time periods, typically of identical length and conventionally one minute in length, to which a period cost is assigned and the accumulation of the period costs for each of the indivisible time periods in the call is the basic cost. The period cost is typically expressed as a dollar value. In some systems, however, period costs may be expressed in terms of messages units, where each message unit has an identical fixed unit cost.

In addition to its basic cost, each call may have a set of additional costs. Typically, the additional costs are each allocated, individually, to one of the subscribers on the call. These additional costs represent the costs associated with particular advanced services beyond the minimum basic telephone service provided for the call. For example, for calls between a wired telephone and a wireless telephone, the basic cost for the call is typically borne by the originating subscriber while the additional cost of so-called "air time charges" is typically borne by the wireless subscriber. Similar to wired telephone charges, air time charges are usually a function of the length of time that passes while wireless telephone is connected.

With conventional wireless billing, some distinctions are made based on whether or not the user has subscribed to airtime services with the carrier currently being accessed. If a call is originated within an area serviced by a carrier with which the caller has a pre-existing billing arrangement, such that a local telephone number has been assigned to the cellular telephone by that carrier, the call can potentially be less expensive than a call made outside such a so-called "home area," during which time the cellular telephone is said to be "roaming" with respect to that carrier.

More particularly, each service company broadcasts a unique System Identification Number (SID) on all paging channels of the frequency sets on which it provides service in a given service area. A suitably equipped cellular telephone can thus determine which service company is providing service on a given paging channel by identifying the SID. Receipt of a home SID is not necessarily required to be able to place a call. Many service companies have reciprocal billing arrangements with one another, meaning that a call can be placed on a frequency associated with a non-home cellular system. However, use of a non-home service company in this manner to place a call may result in the imposition of a surcharge (e.g., a fixed surcharge or a higher per-unit rate).

Wireless communications have become quite popular. Each member of a large family or group, which often has one or more local wired telephones, often has an individual wireless telephone. Calls between family or group members are often frequent and lengthy, which makes it difficult for such groups to control total airtime charges. One type of wireless communication system, such as that provided by Nextel Communications, has the ability to handle both wireless telephone calls and wireless radio calls within talk groups. In this system, users are not charged for each wireless radio call as they are for wireless telephone calls, and therefore business groups have a way to control wireless costs. However, most wireless communication systems are not equipped with the infrastructure required to handle such communications.

Accordingly, there is an existing need to provide alternative incentives for groups or family members using wireless communications.

SUMMARY OF THE INVENTION

Methods and apparatus for use in providing discounted call rates for wireless communications are described. In a preferred method, the method includes the steps of determining whether an originating subscriber and a terminating subscriber of a telephone call are located within a predetermined geographic area, where the predetermined geographic area is smaller than and included within boundaries of a home area of at least one of the subscribers having a wireless connection in the telephone call; determining whether a predetermined relationship exists between the originating and terminating subscribers; and providing data that is indicative of a discounted call rate for the wireless connection if it is determined that the originating and terminating subscribers are located within the predetermined geographic area and have the predetermined relationship. Preferably, the data is indicative of a $0.00 charge per unit time period for the wireless connection.

BRIEF DESCRIPTION OF THE DRAWINGS

FIG. 2 is a diagram of lists of subscriber numbers associated with a subscriber's account;

DETAILED DESCRIPTION OF THE PREFERRED EMBODIMENTS

Methods and apparatus for use in providing discounted wireless call rates are described. Broadly, the preferred method includes the steps of determining whether an originating subscriber and a terminating subscriber of a telephone call are located within a predetermined geographic area, where the predetermined geographic area is smaller than and included within boundaries of a home area of at least one of the subscribers having a wireless connection in the telephone call; determining whether a predetermined relationship exists between the originating and terminating subscribers; and providing data that is indicative of a discounted call rate for the wireless connection if it is determined that the originating and terminating subscribers are located within the predetermined geographic area and have the predetermined relationship. Preferably, the data is indicative of a $0.00 charge per unit time period for the wireless connection. Advantageously, rates for wireless connections for groups or family members may be reduced or eliminated when the calls are made within, for example, particular local areas.

Figure 1:
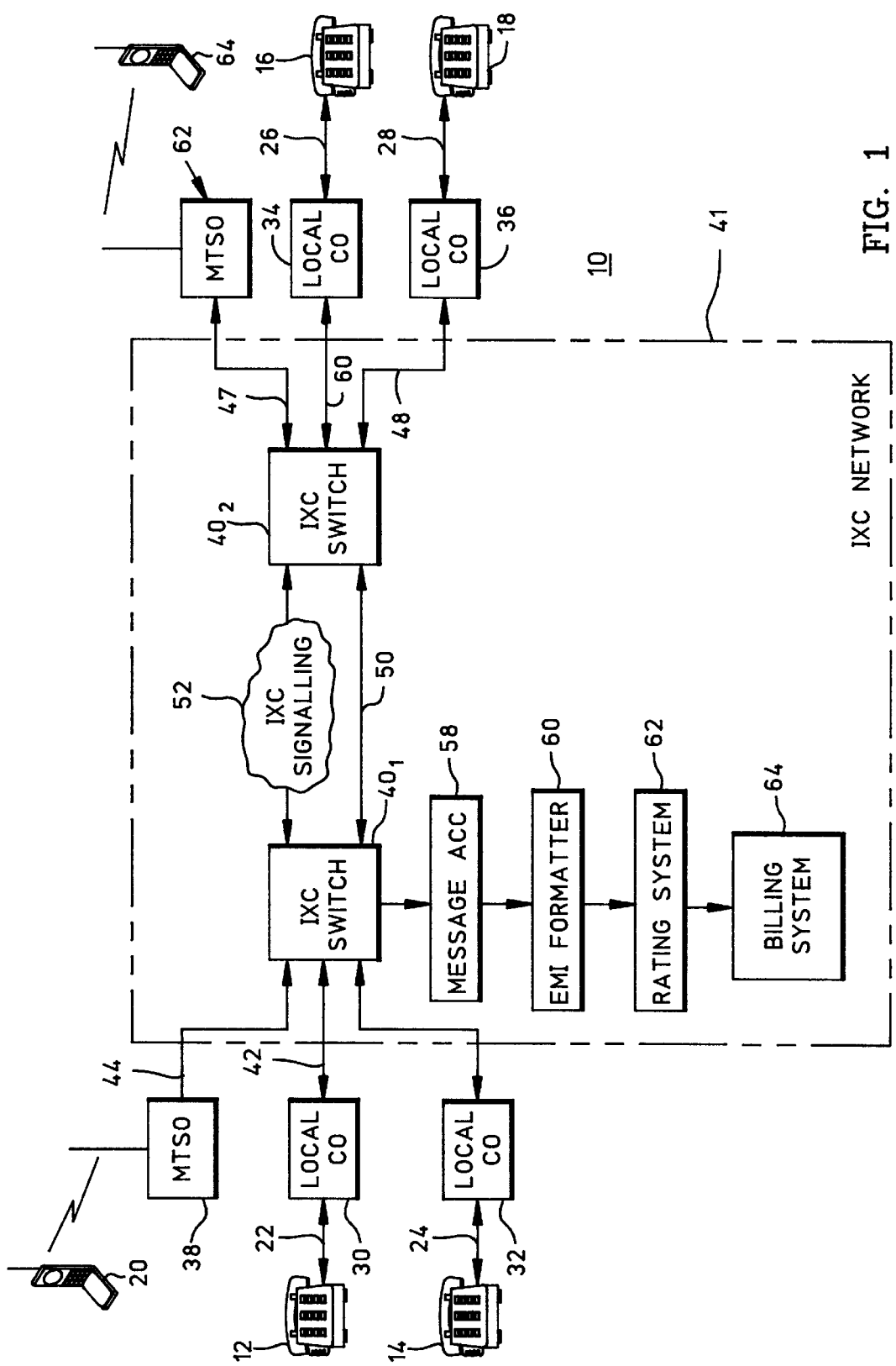
FIG. 1 is a diagram of a telecommunications network which may embody the present invention.

FIG. 1 illustrates a telecommunications network 10 for providing telephone subscribers (represented by telephone stations 12, 14, 16, 18, 20, and 64) with telecommunications services. In the illustrated embodiment, telephone stations 12, 14, 16, and 18 represent "wired" stations. Individual telephone lines 22, 24, 26, and 28 connect telephone stations 12, 14, 16, and 18, respectively, to central offices 30, 32, 34, and 36, respectively. The central offices 30-36 provide the telephone stations 12-16, respectively, with local service (e.g., dial tone). The lines 22, 24, 26, and 28 connecting the telephone stations 12, 14, 16, and 18, respectively, have unique telephone numbers to facilitate call routing and to facilitate filling for telecommunications services. Although the telephone stations 12, 14, 16, and 18 are served by central offices 30, 32, 34, and 36, respectively, a single central office could serve more than one telephone station.

In the illustrated embodiment, telephone station 20 comprises a wireless station (e.g., a cellular or personal communications system terminal) served by a Mobile Telephone Switching Office (MTSO) 38. Similarly, telephone station 64 comprises a wireless station served by an MTSO 62. Each MTSO 62 effectively provides the station 64 with dial tone. Each wireless telephone station 64 has a unique telephone number for call routing and billing purposes.

To enable the telephone stations 12-20 to originate and receive long distance and other telecommunications services, the central offices 30-36 and the MTSO 38 are served by one of the toll switches 401-40n within an Inter-Exchange Carrier (IXC) network 41, such as the IXC network maintained by AT&T. To that end, toll switch 401 is linked via trunks 42, 43, and 44 to central offices 30 and 32 and MTSO 38, respectively. Trunks 47 and 48 link central offices 34 and 36, respectively, to toll switch 402. The switches 401 and 402 in the IXC network 41 are linked to each other by at least one voice trunk 50 and by a signaling network 52, such as AT&T's SS7 signaling network. In this way, the switches receive signaling information and can exchange voice (in-band) traffic.

Each originating switch in the network 41, such as switch 401, is coupled to a message accumulator 58 that records information about the service(s) to be rendered to the incoming call received at the switch. Typically, the information recorded by the message accumulator 58 includes the billing number (typically, the number of the line associated with the telephone station that originated the call), the number of the called party (the number of the line of the telephone station at which the call terminated), the length of the call, and the time at which the call was made. The billing information accumulated by the message accumulator 58 is formatted by a formatter 60 into an industry standard message format.

A rating system 62, typically a data processor or the like, rates the call to establish a charge for billing purposes. In a typical rating of the call, the rating system 62 considers the time of day, the call duration if the origin and end points of the call, the applicable rate, as well as any discounts to be applied to the call. The charge computed by the rating system 62 is communicated to a billing system 64 that generates a bill rendered to the subscriber.

Figure 5:
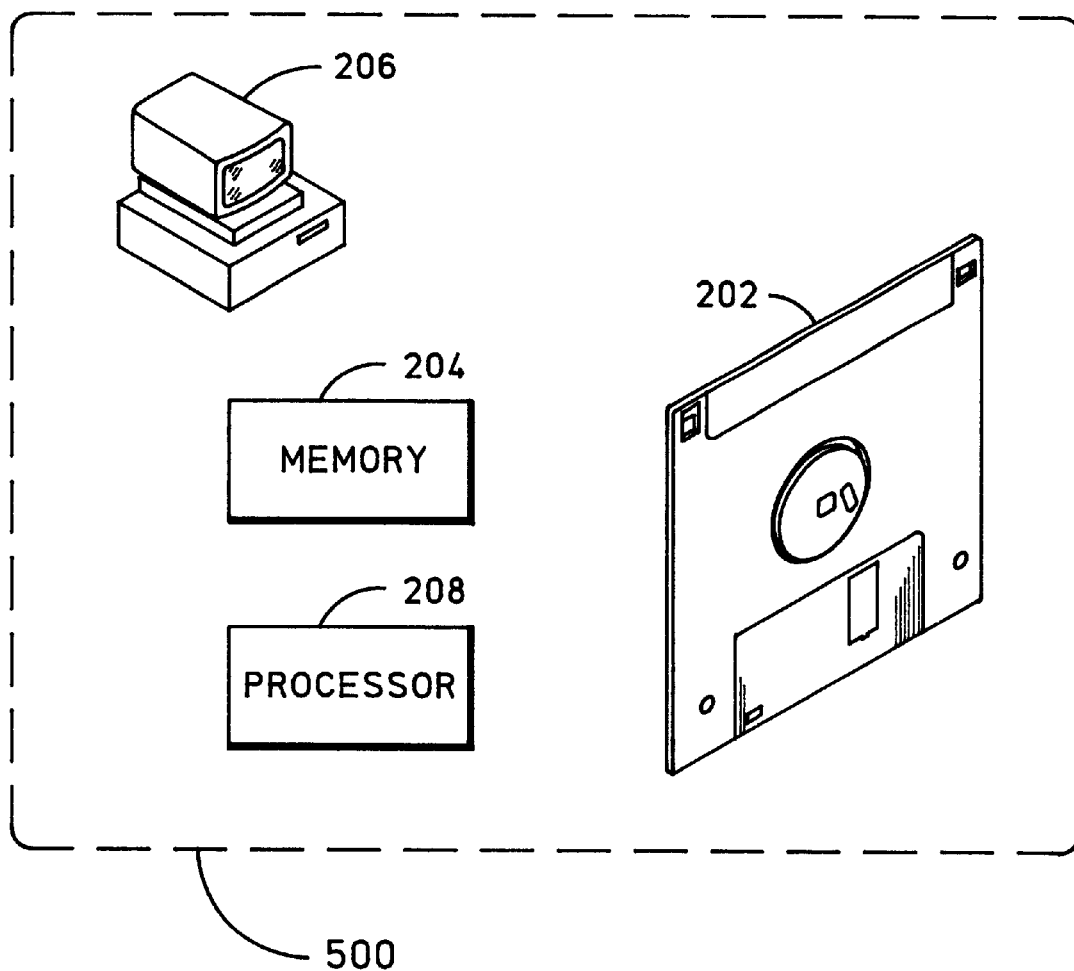
FIG. 5 is a diagram of various software components which may embody the principles of the present invention.

The methods and apparatus described herein are suitable for use in a telecommunication system, such as that shown in FIG. 1, having wireless and wireline subscribers. The methods described herein may easily be embodied and implemented in connection with software, such as with those software components 500 indicated in FIG. 5. Such software may be embedded in or stored on a disk 202 or memory 204, and executable on a computer 206 or a processor 208. Thus, the inventive features may exist in a signal-bearing medium which embodies a program of machine-readable instructions executable by a processing apparatus which perform the methods.

Figure 3:
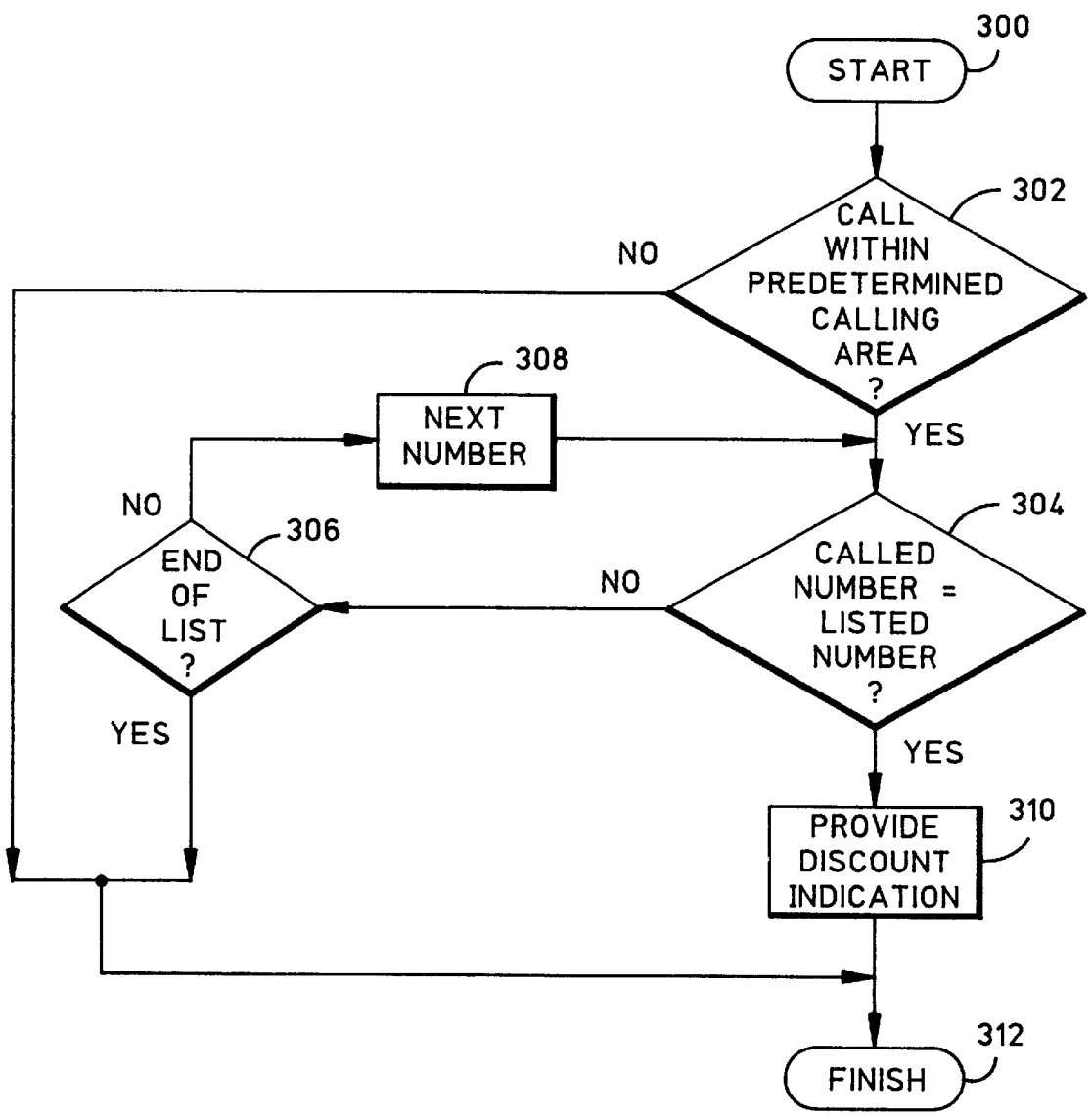
FIG. 3 is a method for use in providing a discounted call rate for wireless communications.

FIG. 3 is a flowchart describing a method for use in providing a discounted call rate for wireless communications. The method is performed during rating or billing of the calls. The method may be used in connection with phone number lists stored in a database, such as phone number lists with information as illustrated in FIG. 2. As indicated, two lists are generally associated with each account: telephone numbers on the account and telephone numbers for those in a special call group. Information is also provided as to whether call group features are activated for the account. Advantageously, telephone numbers listed in the special call group may be associated with mobile subscribers, land line subscribers, or subscribers that are not on the account or that do not have the calling features activated. Other numbers utilized for discount purposes may include a voice mail number, which is typically made available and associated with a subscriber in a home location register (HLR).

Referring back to FIG. 3, it is assumed that a call group feature according to the present invention is activated for a particular subscriber. Over a particular time period, the subscriber has been involved with a number of different telephone calls. The telephone calls may have utilized wired connections (landline) and/or wireless connections (e.g., cellular connections) for the subscribers. Beginning at a start block 300, it is determined whether a particular telephone call was within a predetermined geographic area (step 302). That is, it is determined whether an originating subscriber and a terminating subscriber of the telephone call were located within the predetermined geographic area. (Note that the terminating "subscriber" may be the voice mail system associated with the voice mail telephone number.) Here, a geographic area associated with the call is compared with the predetermined geographic area. If the geographic area is the same as, or included as a part of, the predetermined geographic area, then this test is satisfied. The predetermined geographic area may be referred to herein as a "group area."

Figure 6:
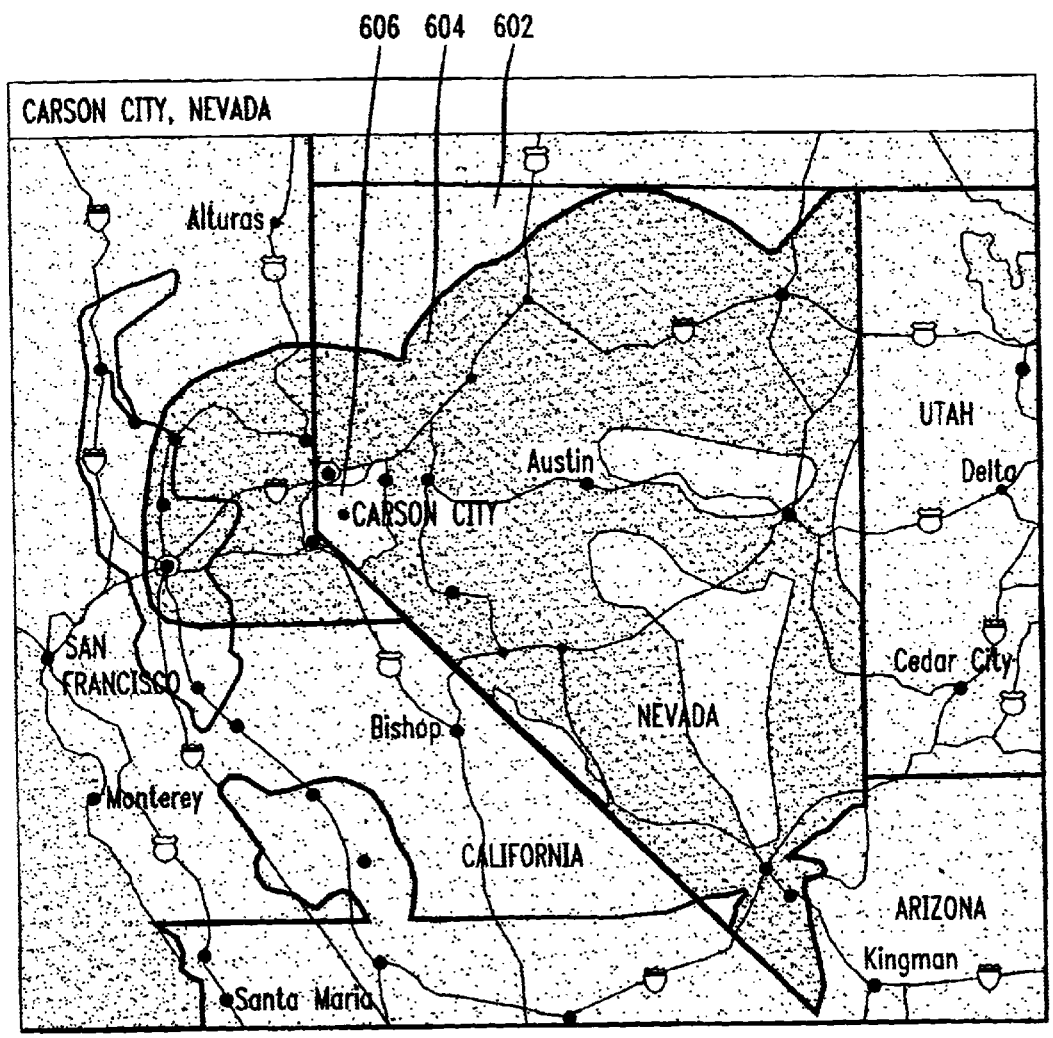
FIG. 6 is an illustrative example of different calling areas, including a group area, a home area, and a roaming area.

Referring ahead to FIG. 6, an illustrative example of the relevant calling areas are shown. The calling areas in FIG. 6 include a roaming area 602, a home area 604, and a group area 606. Home area 604 is associated with at least one of the subscribers having a wireless connection in a telephone call. As shown, a group area is an area that is geographically different from tge home area and roaming area. That is, a given group area has boundaries that are different than the boundaries of its associated home and roaming areas. Preferably, a group area is an area that is smaller than and included within the boundaries of its associated home area. However, the group area may be defined in a number of different ways and is not necessarily confined within the home area.

The group area is preferably defined with the use of one or more system identification codes (SIDs). The group area may be defined by a single or multiple SIDs and stored in association with the customer account. Typically, a cellular telephone contains memory locations known as a number assignment module (NAM) in which an installer technician stores an assigned telephone number and a SID which uniquely identifies a particular carrier which is primarily intended to provide airtime service for that telephone. Alternatively, the area is defined by both one or more SIDs and base identifications (BIDs). The SID (and BID) information is information that is inserted in a call record for each call made. If SIDs are utilized, one or more SIDs from the call are compared with one or more prestored SIDs which define the group area. If a SID for the call matches a prestored SID, then the test is satisfied. The use of BIDs may be handled in the same or similar fashion. As with that shown in FIG. 6, the number of the one or more SIDs that define group area 606 is less than the number of SIDs that define home area 604. Here, the SIDs of group area 606 are a subset of the SIDs of home area 604.

Returning back to FIG. 3, if the call was not within the predetermined geographical area at step 302, the flowchart ends at a finish block 312. If it was within the area, however, the called number is compared with a listed number in the list of subscriber numbers associated with the calling party (step 304). This is performed for outbound calls, where the calling party is a wireless subscriber. For inbound calls, where the called party is the wireless subscriber, the caller number is compared with a listed number in the list of subscriber numbers associated with the called party. If there is no match in step 304, it is determined whether all subscriber numbers in the list have been checked (step 306). If all have been checked, the flowchart ends at the finish block 312. If all subscriber numbers in the list have not been checked at step 306, the next listed number in the list is taken (step 308) and compared to the number (step 304). This process repeats until the end of the list, or until a match is found at step 304.

These steps are preferably executed in connection with telephone number information included in the call record. For example, a call record may include fields for (1) the telephone number of the wireless subscriber, (2) the telephone number "dialed" or for connection, and (3) caller identification (ID) associated with an incoming caller. The telephone number of the wireless subscriber is typically populated in the call record, for calls made either to or from that subscriber. The telephone number "dialed" is typically populated in the call record for calls made from that wireless subscriber. On the other hand, caller ID is populated in the call record for calls made to that wireless subscriber. Preferably, determining whether a predetermined relationship exists between the originating subscriber and the terminating subscriber may also include the step of comparing account numbers of the subscribers (e.g., for numbers on the account in FIG. 2).

If a match is found with a telephone number at step 304, a data indication is provided to indicate a discounted call rate for the wireless call (step 310). (Where applicable, account numbers associated with the telephone numbers should also match.) The data indication is used for the generation of wireless call charges and a bill for the subscriber/customer. More particularly, the data indication is used to discount the wireless charges for qualifying calls. When no such data indication is provided for non-qualifying calls, standard charges are applied. For example, the standard charges may be those charges applied for the home area or the roaming area, depending on the location of the subscriber.

The discount may include, for example, applying a charge per unit time period that is less than a standard charge per unit time period. On the other hand, and preferably, the data is used to rerate the call to $0.00. That is, no charges per unit time period are applied for that wireless call. With this approach, a low fixed (e.g., monthly) rate may be charged in lieu of applying charges per unit time period. Preferably, the processing described in relation to FIG. 3 repeats for all call records associated with the subscriber or account to cover the particular billing time period.

Figure 4:
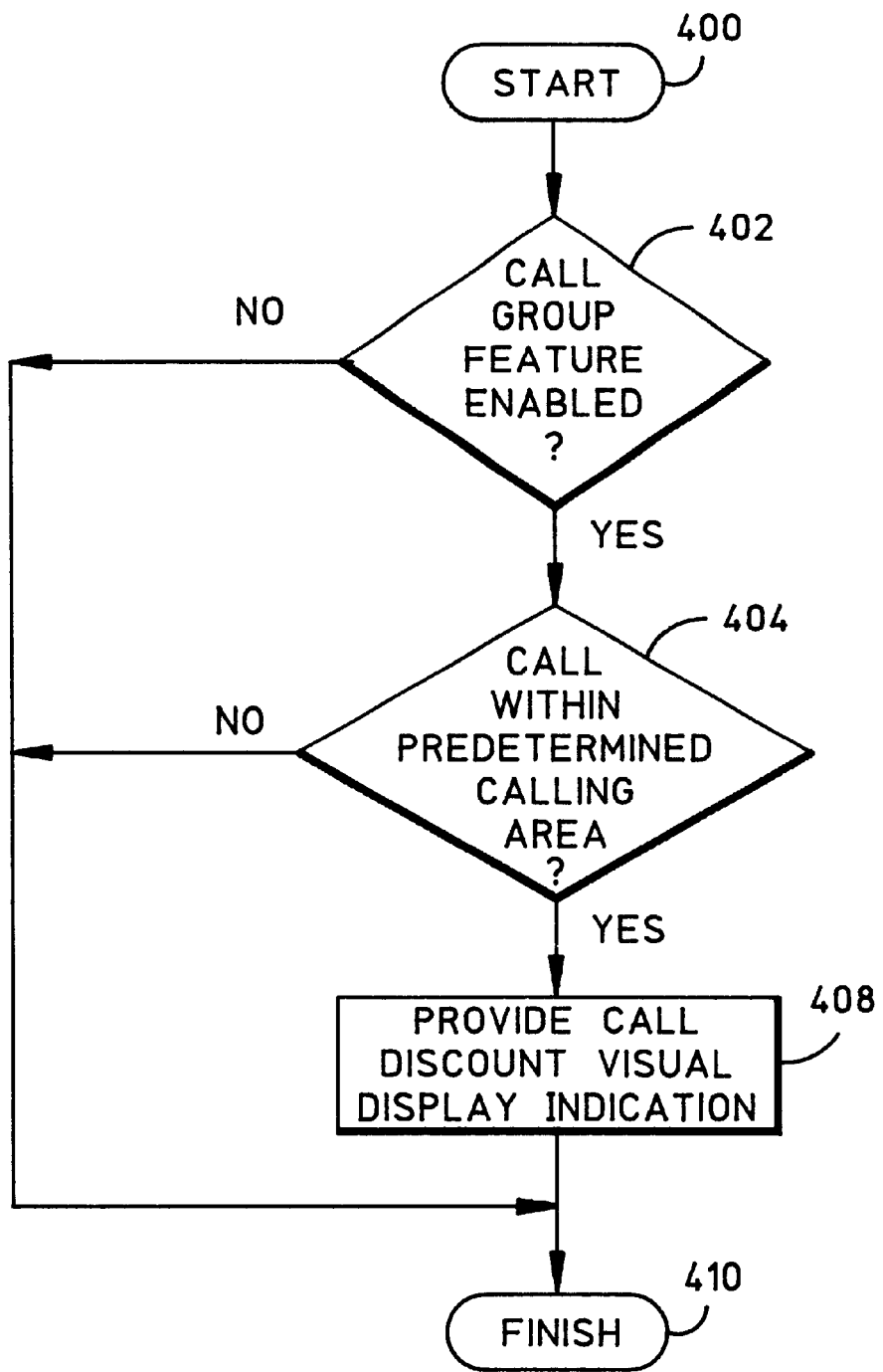
FIG. 4 is a method for use in alerting a subscriber of a discounted call rate for wireless communications.

Referring back to FIG. 4, a flowchart describing a method for use in alerting a telephone subscriber of a discounted call rate for wireless communications is shown. Beginning at a start block 400, it is determined whether a group calling feature is enabled for a subscriber (step 402). If not, the flowchart ends at a finish block 410. If the feature is enabled at step 402, then it is determined whether the subscriber is within a predetermined calling area associated with the feature (step 404). If not, the flowchart ends at the finish block 410. If the subscriber is within the area at step 404, then data is provided to activate a visual or audible alert at the subscriber. For example, the subscriber may have a visual display that reads "DISCOUNT", or "GROUP" or "FAMILY", to indicate that the discounted call rate is available.

According to these: and similar methods, a Group Connections Offer ("GCO") may be established which provides "free airtime" to the following types of calls: (1) calls made to numbers within a customer-defined free calling number table in the customer's home market; (2) calls made to other mobiles on the same account with the feature activated in the customer's home market; (3) calls made from mobiles on the same account with the feature activated in the customer's home market; and (4) incoming calls while roaming for particular locations. Put another way more particularly, qualifying calls will be based on the following criteria: (1) calls made to one of five numbers within a customer designated list stored in a "Free Number Table", when in the customer's home market; (2) calls made to mobiles on the same account with the GCO feature code, when made in the customer's home market; (3) calls made from mobiles on the same account with the GCO feature code, when made in the customer's home market; and (4) incoming calls made while roaming (for some particular SIDs).

On the other hand, a Family Connections Offer ("FCO") may be setup which allows a rating scheme, triggered by a feature code, to be applied to mobiles on the same account with the FCO feature and calls to/from numbers listed on a "Free Number Table" associated with an account. More particularly, free airtime may be provided for the following types of calls: (1) wireless-to-wireless calls made to/from other members of the family; (2) calls to/from their home residential landline number; and (3) calls to/from one other wireless MIN on the same account. Comparing to the GCO, the FCO (1) allows for up to two numbers in the table (one being the home telephone number and the other being a non-member on the same account), whereas the GCO allows up to five numbers; (2) allows calls to and from the telephone numbers in the table to be rerated, whereas the GCO allows only calls to the telephone numbers to be rerated; and (3) allows for a minimum of two subscribers and a maximum of five subscribers per account, whereas the GCO allows for a minimum of five subscribers and a maximum of fifty subscribers per account.

The family calling feature may require all subscribers on the account to be "PIC'd" to a predetermined PIC for their wireless long distance provider, such as AT&T Wireless Services. Here, appropriate checks are made in the steps for billing. When the call record is received, the PIC indicator is compared against a predetermined indicator and, if a match occurs, the discount is provided if all other criteria has been met; otherwise, the discount is not provided. Regarding a "PIC" in general, each subscriber to a local telephone service has an associated primary interexchange carrier (PIC) selected by or for the local subscriber. The local subscriber is said to be "PIC'd" to the associated IXC. When a long-distance call is initiated by the subscriber, the call is routed through the network of the originating subscriber's LEC, over the network of the PIC and, ultimately, through the network of the LEC which has as one of its subscribers the called party.

Advantageously, one preferred method for use in providing a discounted call rate for wireless communications includes the steps of determining whether an originating subscriber and a terminating subscriber of a telephone call are located within a predetermined geographic area, where the predetermined geographic area is smaller than and included within boundaries of a home area of at least one of the subscribers having a wireless connection in the telephone call; determining whether a predetermined relationship exists between the originating and terminating subscribers; and providing data that is indicative of a discounted call rate for the wireless connection if it is determined that the originating and terminating subscribers are located within the predetermined geographic area and have the predetermined relationship.

The method may further include the steps of receiving a call record having dialed telephone digits corresponding to the terminating subscriber; and comparing the dialed telephone digits with each one of multiple telephone numbers in a subscriber list associated with the originating subscriber. The method may also include the steps of receiving a call record having caller identification (ID) information associated with the originating subscriber; and comparing the caller ID information with each one of multiple telephone numbers in a subscriber list associated with the terminating subscriber.

Preferably, the method includes receiving a call record having one or more system identifiers (SIDs) which define a geographic area of the call; and comparing the one or more SIDs with one or more prestored SIDs indicative of the predetermined geographic area. Optionally, the method may include the steps of receiving a call record having a primary interexchange carrier (PIC) indicator; determining whether the PIC indicator has a predetermined value indicative of a predetermined PIC; and providing the data that is indicative of the discounted call rate for the wireless connection if it is determined that the wireless call is within the predetermined geographical area, the predetermined relationship exists between the originating and terminating subscribers, and the PIC indicator has the predetermined value indicative of the predetermined PIC.

As described, the inventive aspects provide several advantages in the field of billing calls for wireless communications. The present invention is a more particular breakthrough in connection with discounting wireless calls for a particular group of subscribers, whether business or family. Thus, the scope of the invention should be understood to be quite broad and warrant a broad range of equivalent structures and functionalities. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A method for use in providing a discounted call rate for wireless communications, comprising:

determining whether an originating subscriber and a terminating subscriber of a telephone call are located within a predetermined geographic area that is smaller than and included within boundaries of a home area of at least one of the subscribers having a wireless connection in the telephone call;

determining whether a predetermined relationship exists between the originating and terminating subscribers; and providing data that is indicative of a discounted call rate for the wireless connection if it is determined that the originating and terminating subscribers are located within the predetermined geographic area and have the predetermined relationship.

2. The method according to claim 1, further comprising:

receiving a call record having a dialed telephone number corresponding to the terminating subscriber; and wherein determining whether a predetermined relationship exists between the originating and terminating subscribers further includes the step of comparing the dialed telephone numbers with each one of multiple telephone numbers in a subscriber list.

3. The method according to claim 1, further comprising:

receiving a call record having caller identification (ID) information associated with the originating subscriber; and wherein the step of determining whether a predetermined relationship exists between the originating and terminating subscribers further includes the step of comparing the caller ID information with each one of multiple telephone numbers in a subscriber list.

4. The method according to claim 1, further comprising:

receiving a call record having one or more system identifiers (SIDs) which define a geographic area of the call.

5. The method according to claim 1, further comprising:

receiving a call record having one or more system identifiers (SIDs) which define a geographic area of the call; and wherein the step of determining whether the originating and terminating subscribers are located within a predetermined geographic area further includes the step of comparing the one or more SIDs with one or more prestored SIDs indicative of the predetermined geographic area.

6. The method according to claim 1, further comprising:

receiving a call record having a primary interexchange carrier (PIC) indicator;

determining whether the PIC indicator has a predetermined value indicative of a predetermined PIC; and providing the data that is indicative of the discounted call rate for the wireless connection if it is determined that the originating and terminating subscribers are located within the predetermined geographical area, the predetermined relationship exists, and the PIC indicator has the predetermined value indicative of the predetermined PIC.

7. The method according to claim 1, wherein the step of providing the data that is indicative of a discounted call rate for the wireless connection further comprises the step of providing data that is indicative of a 0.00 charge per unit time period.

8. A signal-bearing medium tangibly embodying a program of machine-readable instructions executable by a processing apparatus to perform a method for use in providing a discounted call rate for wireless communications, the method comprising the steps of:

determining whether an originating subscriber and a terminating subscriber of a telephone call are located within a predetermined geographic area having different boundaries than a home area of at least one of the subscribers having a wireless connection in the telephone call;

determining whether a predetermined relationship exists between the originating and terminating subscribers; and providing data that is indicative of a discounted call rate for the wireless connection if it is determined that the originating and terminating subscribers are located within the predetermined geographic area and have the predetermined relationship.

9. The medium according to claim 8, wherein the predetermined geographic area is smaller than and included within boundaries of the home area.

10. The medium according to claim 8, wherein the predetermined geographic area comprises boundaries that are outside the home area.

11. The medium according to claim 8, wherein the program of machine-readable instructions is executable by the processing apparatus to perform the further steps of:

receiving a call record having dialed telephone digits corresponding to the terminating subscriber; and wherein determining whether a predetermined relationship exists between the originating and terminating subscribers further includes the step of comparing the dialed telephone digits with each one of multiple telephone numbers in a subscriber list.

12. The medium according to claim 8, wherein the program of machine-readable instructions is executable by the processing apparatus to perform the further steps of:

receiving a call record having caller identification (ID) information associated with the originating subscriber; and wherein the step of determining whether a predetermined relationship exists between the originating and terminating subscribers further includes the step of comparing the caller ID information with each one of multiple telephone numbers in a subscriber list.

13. The medium according to claim 8, wherein the program of machine-readable instructions is executable by the processing apparatus to perform the further steps of:

receiving a call record having one or more system identifiers (SIDs) which define a geographic area of the call; and wherein the step of determining whether the originating and terminating subscribers are located within a predetermined geographic area further includes the step of comparing the one or more SIDs with one or more prestored SIDs indicative of the predetermined geographic area.

14. The medium according to claim 8, wherein the program of machine-readable instructions is executable by the processing apparatus to perform the further steps of:

receiving a call record having a primary interexchange carrier (PIC) indicator;

determining whether the PIC indicator has a predetermined value indicative of a predetermined PIC; and providing the data that is indicative of the discounted call rate for the wireless call if it is determined that the originating and terminating subscribers are within the predetermined geographical area, the predetermined relationship exists, and the PIC indicator has the predetermined value indicative of the predetermined PIC.

15. The medium according to claim 8, wherein the step of providing the data that is indicative of a discounted call rate for the wireless connection further comprises the step of providing data that is indicative of a $0.00 charge per unit time period.

16. A software-implemented method for use in providing a discounted wireless call rate for wireless communications, the method comprising:

receiving a call record having an originating telephone number, a terminating telephone number, and one or more system identification codes (SIDs);

determining whether the one or more SIDs are included as part of a predetermined geographic area that is smaller than and included within boundaries of a home area of at least one of the telephone numbers;

determining whether a predefined relationship exists between the originating telephone number and the terminating telephone number; and providing data that is indicative of a discounted wireless call rate if it is determined that (1) the one or more SIDs are included as part of the predetermined geographic area, and (2) the predetermined relationship exists between the originating telephone number and the terminating telephone number.

17. The method according to claim 16, further comprising:

providing data that is indicative of a non-discounted wireless call rate if it is determined that either (1) the one or more SIDs are not included as part of the predetermined geographic area, or (2) the predetermined relationship does not exist between the originating telephone number and the terminating telephone number.

18. The method according to claim 17, wherein the step of providing of data that is indicative of a discounted wireless call rate further comprises providing data that is indicative of a $0.00 charge per unit time period for the wireless connection.

* * * * *